(12) United States Patent
Gong et al.

(10) Patent No.: US 12,205,523 B2
(45) Date of Patent: Jan. 21, 2025

(54) DISPLAY MODULE, DRIVING METHOD, AND DISPLAY DEVICE

(71) Applicant: WUHAN CHINA STAR OPTOELECTRONICS TECHNOLOGY CO., LTD., Hubei (CN)

(72) Inventors: Qiang Gong, Hubei (CN); Zuoyuan Xu, Hubei (CN); Ronglei Dai, Hubei (CN); Junhui Guo, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/905,253

(22) PCT Filed: Jun. 30, 2022

(86) PCT No.: PCT/CN2022/103045
§ 371 (c)(1),
(2) Date: Aug. 29, 2022

(87) PCT Pub. No.: WO2023/240706
PCT Pub. Date: Dec. 21, 2023

(65) Prior Publication Data
US 2024/0212577 A1    Jun. 27, 2024

(30) Foreign Application Priority Data

Jun. 13, 2022   (CN) .......................... 202210666482.9

(51) Int. Cl.
*G09G 3/32*    (2016.01)
(52) U.S. Cl.
CPC ....... *G09G 3/32* (2013.01); *G09G 2300/0823* (2013.01); *G09G 2310/0267* (2013.01);
(Continued)

(58) Field of Classification Search
CPC ............ G09G 3/32; G09G 2300/0823; G09G 2310/0267; G09G 2310/0275; G09G 2330/022
See application file for complete search history.

(56) References Cited

U.S. PATENT DOCUMENTS 5,303,072 A    4/1994  Takeda
5,844,368 A *  12/1998 Okuda ................ G09G 3/3216
                                                315/169.3
(Continued)

FOREIGN PATENT DOCUMENTS

CN    101089712 A    12/2007
CN    101191922 A     6/2008
(Continued)

OTHER PUBLICATIONS

Korean Office Action issued in corresponding Korean Patent Application No. 10-2022-7030045 dated Feb. 16, 2024, pp. 1-9.
(Continued)

*Primary Examiner* — William Lu
(74) *Attorney, Agent, or Firm* — PV IP PC; Wei Te Chung

(57) ABSTRACT

A display module, a driving method, and a display device are provided. The display module includes a display panel. The display panel includes a plurality of data lines, a plurality of scan lines, and a plurality of sub-pixels. The sub-pixels are respectively located in a plurality of sub-pixel areas defined by the scan lines and the data lines. The display panel further includes a neutralization circuit. The neutralization circuit includes at least one control terminal and at least two coupling terminals. The at least one control terminal is configured to control connection/disconnection between the
(Continued)

at least two coupling terminals. The at least two coupling terminals are respectively electrically connected to at least two of the data lines.

20 Claims, 5 Drawing Sheets

(52) U.S. Cl.
    CPC .............. *G09G 2310/0275* (2013.01); *G09G 2330/022* (2013.01)

(56) References Cited

U.S. PATENT DOCUMENTS

| | | | | |
|---|---|---|---|---|
| 6,518,962 | B2* | 2/2003 | Kimura | H10K 59/13 345/214 |
| 9,607,559 | B2* | 3/2017 | Wen | G09G 3/3607 |
| 11,217,199 | B2* | 1/2022 | Kong | G09G 3/3688 |
| 2002/0036605 | A1* | 3/2002 | Kawashima | G09G 3/3216 345/76 |
| 2003/0053321 | A1* | 3/2003 | Ishiyama | G09G 3/3688 363/59 |
| 2004/0227706 | A1* | 11/2004 | Sung | G09G 3/3233 345/76 |
| 2006/0119551 | A1* | 6/2006 | Chaussy | G09G 3/3283 345/76 |
| 2007/0013643 | A1* | 1/2007 | Hong | G09G 3/3659 345/100 |
| 2008/0074168 | A1 | 3/2008 | Meng | |
| 2008/0136806 | A1* | 6/2008 | Lee | G09G 3/36 345/212 |
| 2008/0278467 | A1* | 11/2008 | Hwang | G09G 3/3648 345/87 |
| 2008/0284771 | A1* | 11/2008 | Matsuki | G09G 3/3692 345/211 |
| 2009/0128533 | A1* | 5/2009 | Tsubata | G02F 1/13624 348/800 |
| 2009/0207192 | A1* | 8/2009 | Hashimoto | G09G 3/3688 345/88 |
| 2013/0083093 | A1* | 4/2013 | Kim | G09G 3/3258 345/212 |
| 2014/0104260 | A1* | 4/2014 | Chang | G09G 3/3607 345/212 |
| 2015/0116383 | A1* | 4/2015 | Kim | G09G 3/3266 345/694 |
| 2017/0092211 | A1* | 3/2017 | Xu | G09G 3/3614 |
| 2020/0234625 | A1* | 7/2020 | Seauve | G11C 19/28 |
| 2024/0221697 | A1* | 7/2024 | Zhang | G09G 3/3611 |

FOREIGN PATENT DOCUMENTS

| | | |
|---|---|---|
| CN | 101221330 A | 7/2008 |
| CN | 101727838 A | 6/2010 |
| CN | 102662264 A | 9/2012 |
| CN | 103345094 A | 10/2013 |
| CN | 103543567 A | 1/2014 |
| CN | 105469765 A | 4/2016 |
| CN | 105955532 A | 9/2016 |
| CN | 109637414 A | 4/2019 |
| CN | 112581911 A | 3/2021 |
| CN | 113393790 A | 9/2021 |
| CN | 113808518 A | 12/2021 |
| CN | 113870762 A | 12/2021 |
| JP | 2014232321 A | 12/2014 |
| JP | 2020521154 A | 7/2020 |
| JP | 2021516354 A | 7/2021 |
| KR | 20050068193 A | 7/2005 |
| KR | 20060119749 A | 11/2006 |
| KR | 20110067355 A | 6/2011 |

OTHER PUBLICATIONS

International Search Report in International application No. PCT/CN2022/103045, mailed on Dec. 19, 2022.
Written Opinion of the International Search Authority in International application No. PCT/CN2022/103045, mailed on Dec. 19, 2022.
Chinese Office Action issued in corresponding Chinese Patent Application No. 202210666482.9 dated Mar. 28, 2023, pp. 1-7.
Japanese Office Action issued in corresponding Japanese Patent Application No. 特願2022-545102 dated Jul. 30, 2024, pp. 1-7.

* cited by examiner

DISPLAY MODULE, DRIVING METHOD, AND DISPLAY DEVICE

CROSS-REFERENCE TO RELATED APPLICATIONS

This application is a U.S. national phase application of a PCT Application No. PCT/CN2022/103045 filed on Jun. 30, 2022, which claims priority to a Chinese Patent Application No. 202210666482.9 filed on Jun. 13, 2022, the disclosures of which are incorporated in their entirety by reference herein.

FIELD OF DISCLOSURE

The present disclosure relates to a technical field of displays, and more particularly to a display module, a driving method, and a display device.

BACKGROUND OF DISCLOSURE

In an existing display panel, such as a liquid crystal display (LCD) panel or an organic light-emitting diode (OLED) display panel, sub-pixels arranged in an array are usually lit up row by row. That is, each row of sub-pixels are turned on in response to a corresponding scan line, and are charged by corresponding data lines to be lit up. Thus, a complete picture frame is displayed. According to a display need of each row of sub-pixels, a voltage on each of the data lines keeps varying between a high level and a low level, causing higher power consumption of the display panel.

SUMMARY OF DISCLOSURE

A technical problem is as follows. Embodiments of the present disclosure provide a display panel, a driving method, and a display device, which can improve the technical problem of higher power consumption of the display panel.

Technical solutions are as follows. Embodiments of the present disclosure provide a display module, including: a display panel, wherein the display panel includes a display area and a non-display area surrounding at least one side of the display area, and includes: a plurality of data lines extending in a column direction and at least partially located in the display area; a plurality of scan lines extending in a row direction, and at least partially located in the display area, so that the scan lines and the data lines define a plurality of sub-pixel areas; and a plurality of sub-pixels respectively located in the sub-pixel areas, wherein each of the sub-pixels is electrically connected to a corresponding one of the scan lines and a corresponding one of the data lines; wherein the display module further includes a neutralization circuit, wherein the neutralization circuit includes at least one control terminal and at least two coupling terminals, wherein the at least one control terminal is configured to control connection/disconnection between the at least two coupling terminals, and wherein the at least two coupling terminals are respectively electrically connected to at least two of the data lines.

In some embodiments, the neutralization circuit includes a plurality of thin film transistors (TFTs), wherein a gate of each of the TFTs serves as a corresponding one of the at least one control terminal, and wherein a source and a drain of each of the TFTs serve as corresponding two of the at least two coupling terminals and are electrically connected to corresponding two of the data lines.

In some embodiments, they are different from the data lines electrically connected to corresponding two of the TFTs adjacent to each of the TFTs.

In some embodiments, one of the source and the drain of each of the TFTs is electrically connected to one of the data lines, and another of the source and the drain of each of the TFTs is electrically connected to another of the data lines through a corresponding one of the TFTs.

In some embodiments, the other of the source and the drain of each of the TFTs is connected to a ground line.

In some embodiments, polarities of the sub-pixels in each same column are same, and polarities of the sub-pixels in each adjacent two columns are opposite, and wherein the source and the drain of each of the TFTs are respectively connected to two of the data lines corresponding to the sub-pixels in adjacent two corresponding columns and with opposite polarities.

In some embodiments, the display module further includes a driving chip, wherein the data lines are electrically connected to the driving chip, and wherein the gates of the TFTs are electrically connected to the driving chip through the at least one control signal line.

In some embodiments, the non-display area includes a first area and a second area which are respectively located on opposite two sides of the scan lines, wherein the data lines are electrically connected to the driving chip through the first area, and wherein the TFTs of the neutralization circuit are located in the second area.

In some embodiments, the at least one control signal line is located in the non-display area, wherein each of the at least one control signal line includes a first segment located in the second area and extending in the row direction, two second segments extending respectively from opposite two ends of the first segment in the column direction toward the first area, and two third segments extending respectively from two ends of the two second segments toward each other, wherein the two ends of the two second segments are away from the two ends of the first segment, and wherein the first segment is electrically connected to the gates of the TFTs, and the two third segments are electrically connected to the driving chip.

Embodiments of the present disclosure also provide a driving method applied to the display module of claim 1, wherein the driving method includes: comparing first power consumption and second power consumption, wherein the first power consumption is power consumption resulting from charging a first voltage on each of the data lines which correspond to the sub-pixels in a current row to a second voltage on each of the data lines which correspond to the sub-pixels in a next row, wherein the second power consumption is power consumption resulting from charging a third voltage on each of the data lines which correspond to the sub-pixels in the current row to the second voltage on each of the data lines which correspond to the sub-pixels in the next row, wherein the third voltage is obtained by applying an active level to the at least one control terminal of the neutralization circuit, to cause the at least two coupling terminals to be connected so that the first voltage on each of the data lines which correspond to the sub-pixels in the current row are neutralized; and according to a comparison result, sending a control signal to the at least one control terminal of the neutralization circuit after the sub-pixels in the current row are turned off, and before the sub-pixels in the next row are turned on, to control connection/disconnection between the at least two coupling terminals.

In some embodiments, formulas for calculating the first power consumption and the second power consumption respectively are as follows: $A=(X_1-x_1)^2+(X_2-x_2)^2+ \ldots +(X_m-x_m)^2$, and $B=(X_1-y_1)^2+(X_2-y_2)^2+ \ldots +(X_m-y_m)_2$, wherein A represents the first power consumption, B represents the second power consumption, $x_1, x_2, \ldots,$ and $x_m$ represent the first voltages on the data lines which correspond to the sub-pixels in the current row, $y_1, y_2, \ldots,$ and $y_m$ represent the third voltages on the data lines which correspond to the sub-pixels in the current row, and $X_1, X_2, \ldots,$ and $X_m$ represent the second voltages on the data lines which correspond to the sub-pixels in the next row.

In some embodiments, when the first power consumption is greater than the second power consumption, the control signal is sent to cause the active level to be applied to the at least one control terminal of the neutralization circuit so that the at least two coupling terminals of the neutralization circuit are connected.

In some embodiments, when the first power consumption is less than or equal to the second power consumption, the control signal is sent to cause an inactive level to be applied to the at least one control terminal of the neutralization circuit so that the at least two coupling terminals of the neutralization circuit are disconnected.

Embodiments of the present disclosure provide a display device including the aforementioned display module.

Advantageous effects are as follows. Compared with the prior art, embodiments of the present disclosure provide a display module, a driving method, and a display device in which selection of whether to turn on the neutralization circuit causes the display module to be driven in a lower power consumption mode, thereby significantly reducing power consumption.

DETAILED DESCRIPTION OF EMBODIMENTS

In order to make the objects, technical solutions, and advantages of the present disclosure more clearly, the present disclosure is further described in detail below with embodiments with reference to the accompanying drawings. It is understood that the specific embodiments described herein are merely illustrative of the present disclosure and are not intended to limit the present disclosure.

Figure 1:
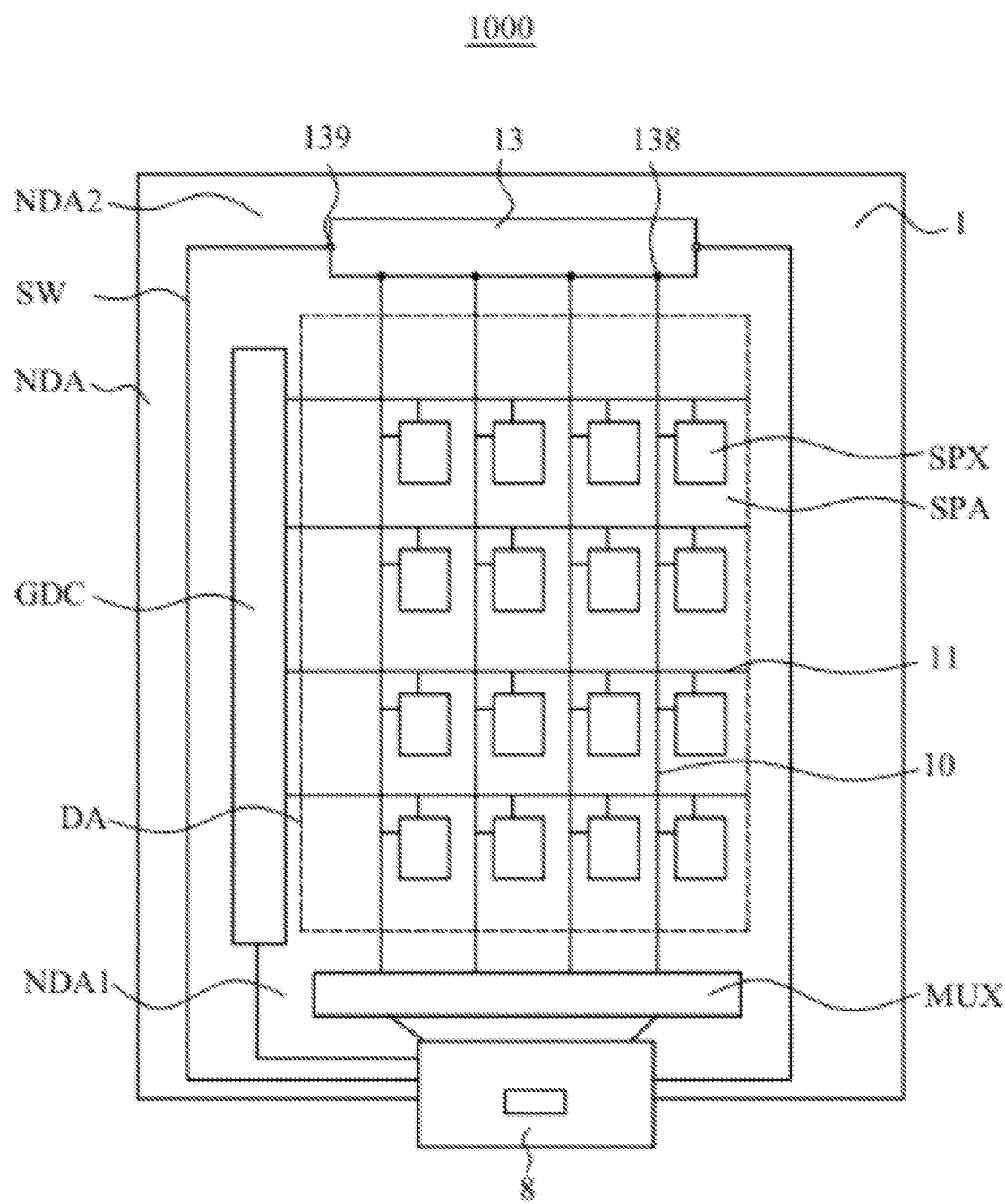
FIG. 1 is a schematic top view diagram of a display module provided by embodiments of the present disclosure.
Figure 2:
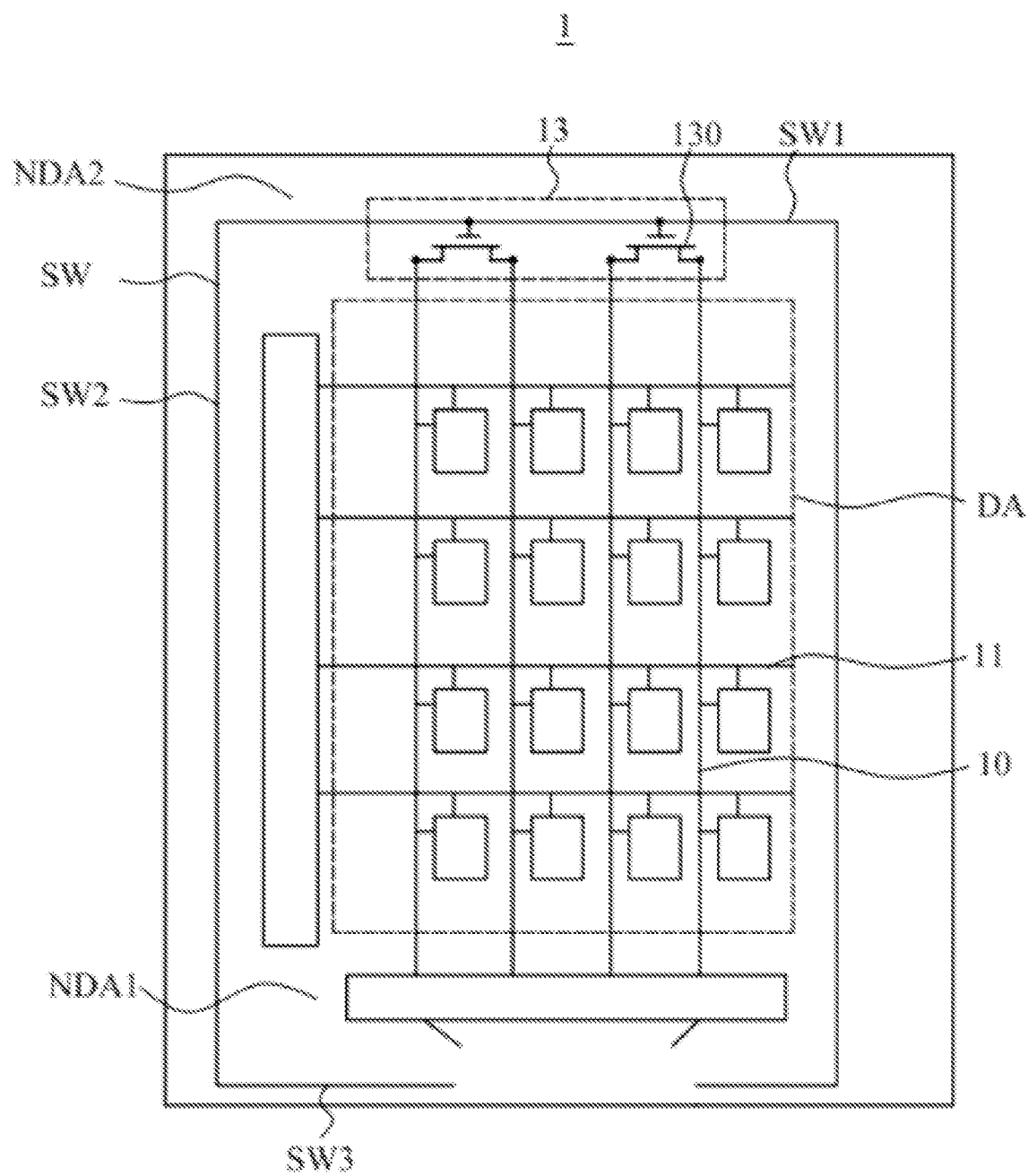
FIG. 2 is a schematic top view diagram of a display panel in FIG. 1.

Referring to FIGS. 1 and 2, embodiments of the present disclosure provide a display module 1000. The display module 1000 includes a display panel 1 and a circuit board. The circuit board includes a driving chip 8 electrically connected to the display panel 1. The display panel 1 can be a liquid crystal display (LCD) panel, or can be an organic light-emitting diode (OLED) display panel. In the present embodiments, the display panel 1 is the LCD display panel.

The display panel 1 includes a display area DA and a non-display area NDA. The display area DA can be an area for disposing sub-pixels that display a picture. The non-display area NDA can be an area for disposing a driving unit (e.g., a gate driving circuit) that provides a driving signal to a pixel driving circuit of each of the sub-pixels and for disposing wiring that provides signals to the driving unit. In the non-display area NDA, generally no sub-pixels for display are disposed. The non-display area NDA can be disposed on at least one side of the display area DA to at least partially surround the display area DA. The non-display area NDA includes a first area NDA1 and a second area NDA2 which are opposite to each other.

The display panel 1 includes a plurality of data lines 10, a plurality of scan lines 11, a plurality of sub-pixels SPX, and a neutralization circuit 13.

The data lines 10 extend in a column direction. The data lines 10 are at least partially located in the display area DA, and are electrically connected to the driving chip 8 through a demultiplexing circuit MUX in the first area NDA1. The demultiplexing circuit MUX includes a plurality of thin film transistors (TFTs) and can reduce a number of data terminals of the driving chip.

The scan lines 11 extend in a row direction. The scan lines 11 are at least partially located in the display area DA, and are electrically connected to the circuit board through a gate driving circuit GDC located in the non-display area NDA. The scan lines 11 and the data lines 10 define a plurality of sub-pixel areas SPA.

The sub-pixels SPX are respectively located in the sub-pixel areas SPA. Each of the sub-pixels SPX is a smallest controllable light-emitting unit in the display panel 1. Each of the sub-pixels SPX can include a pixel driving circuit and a liquid crystal cell driven by the pixel driving circuit. The pixel driving circuit is electrically connected to a corresponding one of the scan lines 11 and a corresponding one of the data lines 10. The pixel driving circuit can include at least one TFT. A gate of each TFT and the scan lines 11 are disposed in a same layer and are made of same material. A source and a drain of each TFT and the data lines 10 are disposed in a same layer and are made of same material. For the OLED display panel, each of the sub-pixels SPX can include a pixel driving circuit and an organic light-emitting device driven by the pixel driving circuit.

The neutralization circuit 13 is located in the second area NDA2. In this way, width of the first area NDA1 (i.e., a lower border) can be reduced. The neutralization circuit 13 includes a plurality of TFTs 130. The TFTs 130 and the TFTs in the display area DA are disposed in same layers. Thus, the neutralization circuit 13 can be integrated in an array substrate.

A source and a drain of each of the TFTs 130 are respectively electrically connected to two of the data lines 10 which are different from the data lines 10 electrically connected to corresponding two of the TFTs 130 adjacent to each of the TFTs 130. Thus, the sources and the drains of the TFTs 130 serve as at least two coupling terminals 138 of the neutralization circuit 13. The at least two coupling terminals 138 are respectively electrically connected to at least two of the data lines 10. In this way, neutralization of voltages on two of the data lines 10 can be achieved by one of the TFTs 130. Exemplarily, the sub-pixels SPX can be driven in a column inversion manner, so that polarities of the sub-pixels SPX in each same column are same, and polarities of the sub-pixels SPX in each adjacent two columns are opposite. The source and the drain of each of the TFTs 130 are respectively connected to two of the data lines 10 corresponding to the sub-pixels SPX in adjacent two corresponding columns and with opposite polarities. Thus, after voltages of the two of the data lines 10 corresponding to the sub-pixels SPX in the adjacent two corresponding columns and with the opposite polarities are neutralized to obtain a medium value, the two of the data lines 10 are respectively charged to voltages correspondingly with opposite polarities, thereby reducing power consumption.

Gates of the TFTs 130 serve as at least one control terminal 139 of the neutralization circuit 13. The gates of the TFTs 130 are electrically connected to the driving chip 8 through at least one control signal line SW to control connection/disconnection between the at least two coupling terminals 138 according to a control signal of the driving chip 8, and thus control electrical connection between the at least two of the data lines 10.

The at least one control signal line SW is located in the non-display area NDA. The at least one control signal line SW and the data lines 10 are disposed in the same layer and are made of the same material. Each of the at least one control signal line SW includes a first segment SW1 located in the second area NDA2 and extending in the row direction, two second segments SW2 extending respectively from opposite two ends of the first segment SW1 in the column direction toward the first area NDA1, and two third segments SW3 extending respectively from two ends of the two second segments SW2 toward each other. The first segment SW1 is electrically connected to the gates of the TFTs 130. The two third segments SW3 are electrically connected to the driving chip 8. In this way, a function of the control signal line SW can be achieved without affecting disposition of other signal lines. Exemplarily, material of the control signal line SW can include at least one selected from molybdenum (Mo), aluminum (Al), platinum (Pt), palladium (Pd), silver (Ag), magnesium (Mg), gold (Au), nickel (Ni), neodymium (Nd), iridium (Ir), chromium (Cr), calcium (Ca), titanium (Ti), tantalum (Ta), tungsten (W), and copper (Cu). The control signal line SW can be a single-layer structure or a multi-layer structure. For example, the control signal line SW can be formed as a layered structure such as Ti/Al/Ti, Mo/Al/Mo, Mo/AlGe/Mo, or Ti/Cu.

In the present embodiments, after the sub-pixels SPX in a current row are turned off, and before the sub-pixels SPX in a next row are turned on, the driving chip 8 outputs a control signal to the at least one control terminal 139 of the neutralization circuit 13 through at least one control signal line SW, to cause the at least two coupling terminals 138 of the neutralization circuit 13 to be connected or disconnected.

Figure 3:
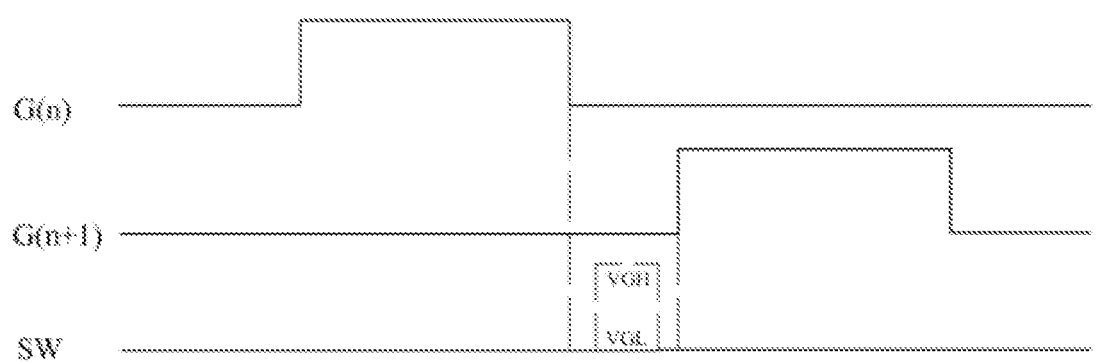
FIG. 3 is a schematic driving timing diagram of the display panel in FIG. 1.

Referring to FIG. 3 together, when the driving chip 8 outputs the control signal (e.g., a VGL signal) to the at least one control terminal 139 of the neutralization circuit 13 through the at least one control signal line SW, the at least two coupling terminals 138 of the neutralization circuit 13 are disconnected. That is, when the display module 1000 is in a normal driving mode, a first voltage on each of the data lines 10 which correspond to the sub-pixels SPX in the current row is directly charged to a second voltage on each of the data lines 10 which correspond to the sub-pixels SPX in the next row.

When the driving chip 8 outputs the control signal (e.g., a VGH signal) to the at least one control terminal 139 of the neutralization circuit 13 through the at least one control signal line SW, the at least two coupling terminals 138 of the neutralization circuit 13 are connected. That is, when the display module 1000 is in a neutralization driving mode, the first voltage on each of the data lines 10 which correspond to the sub-pixels SPX in the current row is first neutralized to a third voltage and then charged to the second voltage on each of the data lines 10 which correspond to the sub-pixels SPX in the next row.

Thus, the display module 1000 can determine a driving mode on the basis of various pictures and according to power consumption of the display module 1000 in these two driving modes, to select an optimal condition for the power consumption. Especially in the case of, for example, a heavy load picture, power consumption can be significantly reduced, and an effect is remarkable. Through simulation, when the neutralization circuit 13 is turned on for 0.2 µs, potentials on the data lines 10 can be reduced by more than 90%.

Figure 4:
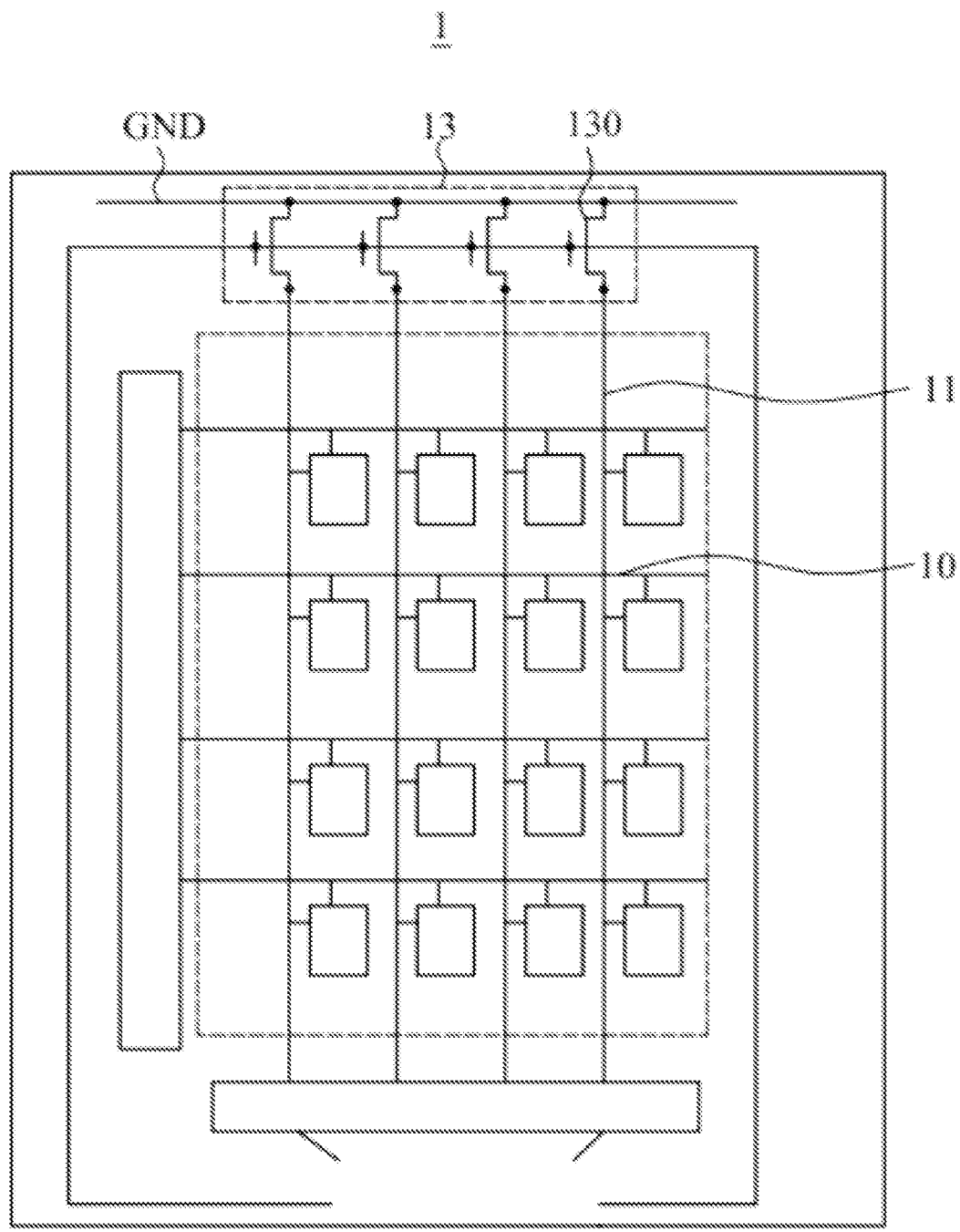
FIG. 4 is a schematic top view diagram of a display panel provided by embodiments of the present disclosure.

Referring to FIG. 4, in other embodiments, difference between the other embodiments and the aforementioned embodiments is that one of a source and a drain of each of the TFTs 130 is electrically connected to one of the data lines 10. Another of the source and the drain of each of the TFTs 130 is electrically connected to another of the data lines 10 through a corresponding one of the TFTs 130. The data lines 10 are electrically connected to each other through the TFTs 130, thereby achieving neutralization of voltages on the data lines 10. Exemplarily, the other of the source and the drain of each of the TFTs 130 is connected to a ground line GND In other embodiments, there can be a multiple of the control signal lines SW. The TFTs 130 connected to the multiple of the control signal lines SW are different. In this way, driving speed of the driving chip 8 and for the neutralization circuit is increased.

Figure 5:
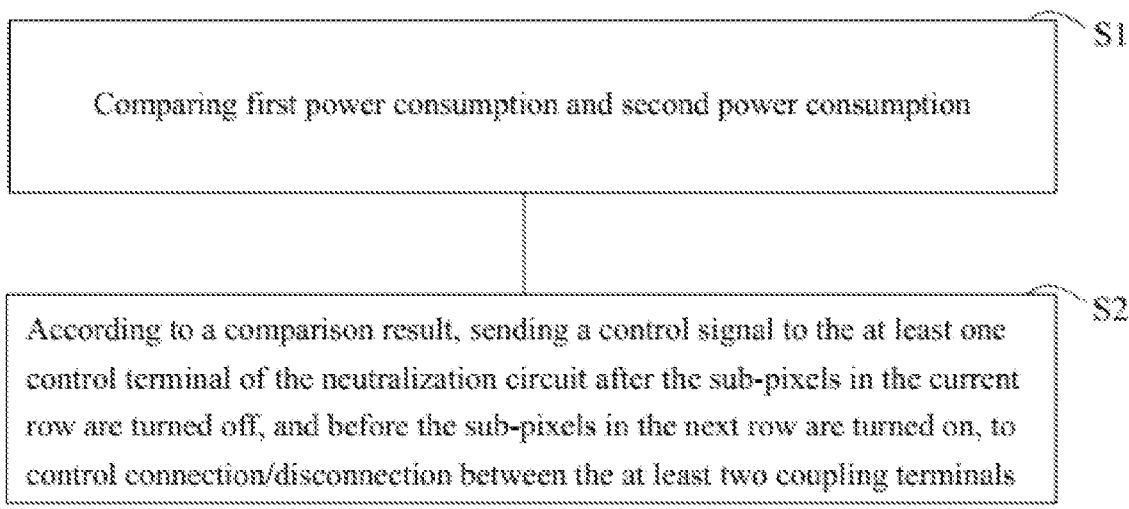
FIG. 5 is a schematic flowchart of a method for driving a display module provided by embodiments of the present disclosure.

Referring to FIG. 5, embodiments of the present disclosure also provide a driving method applied to the aforementioned display module 1000. The driving method can be executed by the driving chip 8 of the display module 1000, or can be executed by a processor (e.g., a central processing chip) of a display device including the display module 1000. The driving method includes:

In step S1, first power consumption and second power consumption are compared. The first power consumption is power consumption resulting from charging a first voltage on each of the data lines 10 which correspond to the sub-pixels SPX in a current row to a second voltage on each of the data lines 10 which correspond to the sub-pixels SPX in a next row. The second power consumption is power consumption resulting from charging a third voltage on each of the data lines 10 which correspond to the sub-pixels SPX in the current row to the second voltage on each of the data lines 10 which correspond to the sub-pixels SPX in the next row. The third voltage is obtained by applying an active level to the at least one control terminal 139 of the neutralization circuit 13, to cause the at least two coupling terminals 138 to be connected so that the first voltage on each of the data lines 10 which correspond to the sub-pixels SPX in the current row are neutralized.

Exemplarily, the first voltages on the data lines 10 which correspond to the sub-pixels SPX in a row $G(n)$ respectively are $x_1, x_2, \ldots,$ and $x_m$. After voltage neutralization, the third voltages on the data lines 10 which correspond to the sub-pixels SPX in the row $G(n)$ respectively are $y_1, y_2, \ldots,$ and $y_m$. The second voltages on the data lines 10 which correspond to the sub-pixels SPX in a row $G(n+1)$ respectively are $X_1, X_2, \ldots,$ and $X_m$. On the basis that power consumption is proportional to a square of a charging voltage difference, we can consider the first power consumption A in the normal driving mode to be equal to $(X_1-x_1)^2+(X_2-x_2)^2+\ldots+(X_m-x_m)^2$, and the second power consumption B in the neutralization driving mode to be equal to $(X_1-y_1)^2+(X_2-y_2)^2+\ldots+(X_m-y_m)^2$. By comparing values of the first power consumption A and the second power consumption B, values of power consumption of the display module 1000 respectively in the normal driving mode and the neutralization driving mode can be known.

In step S2, according to a comparison result, a control signal is sent to the at least one control terminal 139 of the neutralization circuit 13 after the sub-pixels SPX in the current row are turned off, and before the sub-pixels SPX in the next row are turned on, to control connection/disconnection between the at least two coupling terminals 138.

When the first power consumption A is greater than the second power consumption B. i.e., when the display module 1000 in the neutralization driving mode has lower power consumption, the control signal is sent after the sub-pixels SPX in the row G(n) are turned off, and before the sub-pixels SPX in the row G(n+1) are turned on, to cause the active level (e.g., a VGH signal) to be applied to the at least one control terminal 139 of the neutralization circuit 13 so that the at least two coupling terminals 138 of the neutralization circuit 13 are connected. The first voltage on each of the data lines 10 which correspond to the sub-pixels SPX in the row G(n) is first neutralized to the third voltage and then charged to the second voltage on each of the data lines 10 which correspond to the sub-pixels SPX in the row G(n+1). Thus, low power consumption can be achieved.

When the first power consumption A is less than or equal to the second power consumption B. i.e., when the display module 1000 in the normal driving mode has lower power consumption, the control signal is sent after the sub-pixels SPX in the row G(n) are turned off, and before the sub-pixels SPX in the row G(n+1) are turned on, to cause an inactive level (e.g., a VGL signal of which a potential is less than that of the VGH signal) to be applied to the at least one control terminal 139 of the neutralization circuit 13 so that the at least two coupling terminals 138 of the neutralization circuit 13 are disconnected. The first voltage on each of the data lines 10 which correspond to the sub-pixels SPX in the row G(n) is directly charged to the second voltage on each of the data lines 10 which correspond to the sub-pixels SPX in the row G(n+1). Thus, low power consumption can be achieved.

Embodiments of the present disclosure also provide a display device including the aforementioned display module 1000, a processor electrically connected to the display module 1000, and a storage device. The storage device is configured to store program instructions. The processor or the driving chip of the display module 1000 is configured to execute the program instructions to implement the aforementioned driving method. The storage device can be a read only memory (ROM) and a random access memory (RAM) of the display device, or can be a flash memory of the display module.

The display device is a device with a display function. Exemplarily, the display device can be a device that displays video or still images. The display device includes a fixed terminal such as a television, a desktop computer, a monitor, or a billboard. Or the display device can include a mobile terminal such as a mobile phone, a tablet computer, a mobile communication terminal, an electronic notepad, an electronic book, a multimedia player, a navigator, or a notebook computer. Or the display device can include a wearable electronic device such as a smart watch, smart glasses, a virtual reality device, or an augmented reality device.

Embodiments of the present disclosure have been described in detail above. The principles and implementation manners of the present disclosure are described herein using specific examples. The description of the foregoing embodiments is only for facilitating understanding the present disclosure. At the same time, for those skilled in the art, changes in specific embodiments and application scope can be made on the basis of the idea of the present disclosure. In summary, content of the present specification should not be construed as a limitation to the present disclosure.

What is claimed is:

1. A display module, comprising: a display panel, wherein the display panel comprises a display area and a non-display area surrounding at least one side of the display area, and comprises:
   a plurality of data lines extending in a column direction and at least partially located in the display area;
   a plurality of scan lines extending in a row direction, and at least partially located in the display area, so that the scan lines and the data lines define a plurality of sub-pixel areas; and
   a plurality of sub-pixels respectively located in the sub-pixel areas, wherein each of the sub-pixels is electrically connected to a corresponding one of the scan lines and a corresponding one of the data lines;
   wherein the display module further comprises a neutralization circuit, wherein the neutralization circuit comprises at least one control terminal and at least two coupling terminals, wherein the at least one control terminal is configured to control connection/disconnection between the at least two coupling terminals, and wherein the at least two coupling terminals are respectively electrically connected to at least two of the data lines;
   the neutralization circuit is configured to control the display module to be in a normal driving mode or in a neutralization driving mode; when the display module is in the normal driving mode, a first voltage on each of the data lines corresponded to the sub-pixels in a current row is directly charged to a second voltage on each of the data lines corresponded to the sub-pixels in a next row; when the display module is in the neutralization driving mode, the first voltage on each of the data lines corresponded to the sub-pixels in the current row is first neutralized to a third voltage and then charged to the second voltage on each of the data lines corresponded to the sub-pixels in the next row.

2. The display module of claim 1, wherein the neutralization circuit comprises a plurality of thin film transistors (TFTs), wherein a gate of each of the TFTs serves as a corresponding one of the at least control terminal, and wherein a source and a drain of each of the TFTs serve as corresponding two of the at least two coupling terminals and are electrically connected to corresponding two of the data lines.

3. The display module of claim 2, wherein the data lines electrically connected to two adjacent TFTs are different from each other.

4. The display module of claim 2, wherein one of the source and the drain of each of the TFTs is electrically connected to one of the data lines, and another of the source and the drain of each of the TFTs is electrically connected to another of the data lines through a corresponding one of the TFTs.

5. The display module of claim 4, wherein the other of the source and the drain of each of the TFTs is connected to a ground line.

6. The display module of claim 2, wherein polarities of the sub-pixels in each same column are same, and polarities of the sub-pixels in each adjacent two columns are opposite, and wherein the source and the drain of each of the TFTs are respectively connected to two of the data lines corresponding to the sub-pixels in adjacent two corresponding columns and with opposite polarities.

7. The display module of claim 2, wherein the display module further comprises a driving chip, wherein the data lines are electrically connected to the driving chip, and wherein the gates of the TFTs are electrically connected to the driving chip through the at least one control signal line.

8. The display module of claim 7, wherein the non-display area comprises a first area and a second area which are respectively located on opposite two sides of the scan lines, wherein the data lines are electrically connected to the driving chip through the first area, and wherein the TFTs of the neutralization circuit are located in the second area.

9. The display module of claim 8, wherein the at least one control signal line is located in the non-display area, wherein each of the at least one control signal line comprises a first segment located in the second area and extending in the row direction, two second segments extending respectively from opposite two ends of the first segment in the column direction toward the first area, and two third segments extending respectively from two ends of the two second segments toward each other, wherein the two ends of the two second segments are away from the two ends of the first segment, and wherein the first segment is electrically connected to the gates of the TFTs, and the two third segments are electrically connected to the driving chip.

10. A driving method applied to the display module of claim 1, wherein the driving method comprises:
comparing first power consumption and second power consumption, wherein the first power consumption is power consumption resulting from charging a first voltage on each of the data lines which correspond to the sub-pixels in a current row to a second voltage on each of the data lines which correspond to the sub-pixels in a next row, wherein the second power consumption is power consumption resulting from charging a third voltage on each of the data lines which correspond to the sub-pixels in the current row to the second voltage on each of the data lines which correspond to the sub-pixels in the next row, wherein the third voltage is obtained by applying an active level to the at least one control terminal of the neutralization circuit, to cause the at least two coupling terminals to be connected so that the first voltage on each of the data lines which correspond to the sub-pixels in the current row are neutralized; and
according to a comparison result, sending a control signal to the at least one control terminal of the neutralization circuit after the sub-pixels in the current row are turned off, and before the sub-pixels in the next row are turned on, to control connection/disconnection between the at least two coupling terminals.

11. The driving method of claim 10, wherein formulas for calculating the first power consumption and the second power consumption respectively are as follows: $A=(X_1-x_1)^2+(X_2-x_2)^2+ \ldots +(X_m-x_m)^2$, and $B=(X_1-y_1)^2+(X_2-y_2)^2+ \ldots +(X_m-y_m)^2$, wherein A represents the first power consumption, B represents the second power consumption, $x_1, x_2, \ldots,$ and $x_m$ represent the first voltages on the data lines which correspond to the sub-pixels in the current row, $y_1, y_2, \ldots,$ and $y_m$ represent the third voltages on the data lines which correspond to the sub-pixels in the current row, $X_1, X_2, \ldots,$ and $X_m$ represent the second voltages on the data lines which correspond to the sub-pixels in the next row, and m represents a number of the sub-pixels in one row.

12. The driving method of claim 10, wherein when the first power consumption is greater than the second power consumption, the control signal is sent to cause the active level to be applied to the at least one control terminal of the neutralization circuit so that the at least two coupling terminals of the neutralization circuit are connected.

13. The driving method of claim 10, wherein when the first power consumption is less than or equal to the second power consumption, the control signal is sent to cause an inactive level to be applied to the at least one control terminal of the neutralization circuit so that the at least two coupling terminals of the neutralization circuit are disconnected.

14. A display device, comprising: a display module, wherein the display module comprises a display panel, wherein the display panel comprises a display area and a non-display area surrounding at least one side of the display area, and comprises:
a plurality of data lines extending in a column direction and at least partially located in the display area;
a plurality of scan lines extending in a row direction, and at least partially located in the display area, so that the scan lines and the data lines define a plurality of sub-pixel areas; and
a plurality of sub-pixels respectively located in the sub-pixel areas, wherein each of the sub-pixels is electrically connected to a corresponding one of the scan lines and a corresponding one of the data lines;
wherein the display module further comprises a neutralization circuit, wherein the neutralization circuit comprises at least one control terminal and at least two coupling terminals, wherein the at least one control terminal is configured to control connection/disconnection between the at least two coupling terminals, and wherein the at least two coupling terminals are respectively electrically connected to at least two of the data lines;
the neutralization circuit is configured to control the display module to be in a normal driving mode or in a neutralization driving mode; when the display module is in the normal driving mode, a first voltage on each of the data lines corresponded to the sub-pixels in a current row is directly charged to a second voltage on each of the data lines corresponded to the sub-pixels in a next row; when the display module is in the neutralization driving mode, the first voltage on each of the data lines corresponded to the sub-pixels in the current row is first neutralized to a third voltage and then charged to the second voltage on each of the data lines corresponded to the sub-pixels in the next row.

15. The display device of claim 14, wherein the neutralization circuit comprises a plurality of thin film transistors (TFTs), wherein a gate of each of the TFTs serves as a corresponding one of the at least control terminal, and wherein a source and a drain of each of the TFTs serve as corresponding two of the at least two coupling terminals and are electrically connected to corresponding two of the data lines.

16. The display device of claim 15, wherein the data lines electrically connected to two adjacent TFTs are different from each other.

17. The display device of claim 15, wherein one of the source and the drain of each of the TFTs is electrically connected to one of the data lines, and another of the source and the drain of each of the TFTs is electrically connected to another of the data lines through a corresponding one of the TFTs, or another of the source and the drain of each of the TFTs is electrically connected to a ground line.

18. The display device of claim 15, wherein polarities of the sub-pixels in each same column are same, and polarities of the sub-pixels in each adjacent two columns are opposite, and wherein the source and the drain of each of the TFTs are respectively connected to two of the data lines corresponding to the sub-pixels in adjacent two corresponding columns and with opposite polarities.

19. The display device of claim 15, wherein the display module further comprises a driving chip, wherein the data lines are electrically connected to the driving chip, and wherein the gates of the TFTs are electrically connected to the driving chip through the at least one control signal line.

20. The display device of claim 19, wherein the non-display area comprises a first area and a second area which are respectively located on opposite two sides of the scan lines, wherein the data lines are electrically connected to the driving chip through the first area, and wherein the TFTs of the neutralization circuit are located in the second area.

* * * * *